United States Patent [19]

Hock

[11] 3,891,322
[45] June 24, 1975

[54] METHOD OF LOCATING THE PLANE OF SHARP FOCUSSING OF AN IMAGE AND APPARATUS THEREFOR

[75] Inventor: Fromund Hock, Wetzlar, Germany
[73] Assignee: Ernst Leitz GmbH, Germany
[22] Filed: Nov. 27, 1973
[21] Appl. No.: 419,430

[52] U.S. Cl. .............................. 356/126; 356/124
[51] Int. Cl. ............................................ G01b 9/00
[58] Field of Search ............................ 356/124, 126

[56] References Cited
UNITED STATES PATENTS
2,897,722  8/1959  Gunter, Jr. et al. ............... 356/126
3,447,874  6/1969  Back ................................. 356/124

OTHER PUBLICATIONS
Lens Testing Apparatus, by Deerhake et al., IBM Technical Disclosure Bulletin, Vol. 7, No. 9, Feb. 1965, p. 795.

*Primary Examiner*—Archie R. Borchelt
*Attorney, Agent, or Firm*—Kraft & Wells

[57] ABSTRACT

A method of locating the plane of sharp focusing of an image. The method comprises the step of employing a scattering element to scatter image radiation incident thereon. The scattering element has at least one spatial frequency within a range corresponding to a range of spatial frequencies present in the image. From at least a part of said scattered image radiation electrical signals are generated and subsequently combined to derive an electrical output system. The spacing between the imaging signal and the scattering element is so controlled as to cause the electrical output signal to adopt a maximum value.

18 Claims, 1 Drawing Figure

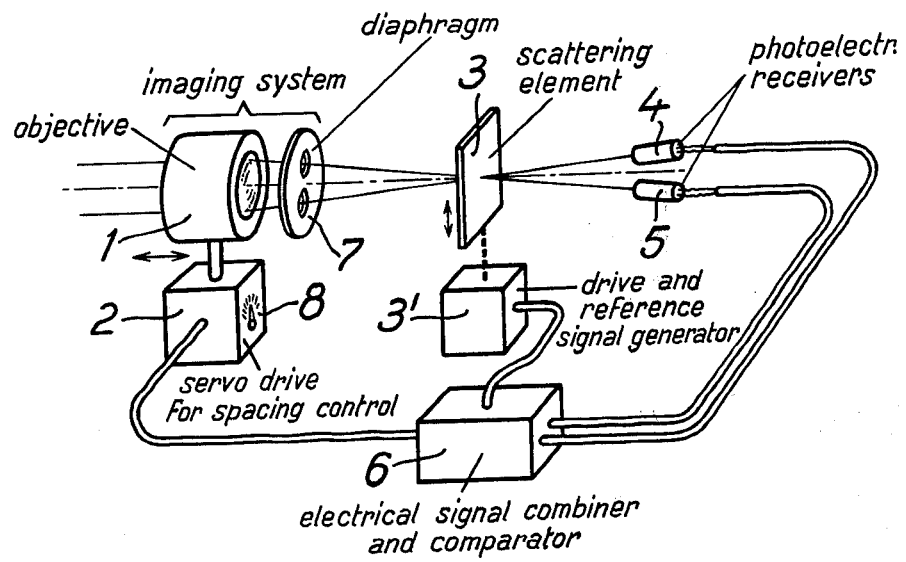

METHOD OF LOCATING THE PLANE OF SHARP FOCUSSING OF AN IMAGE AND APPARATUS THEREFORE

BACKGROUND OF THE INVENTION

The present invention relates to a method of and apparatus for locating the plane of sharp focussing of an image formed by an imaging system.

Automatic focussing arrangements for optical systems are known, in which an image is formed by an optical system on an observation field movable relative to it. Connected with the optical system is a displacement arrangement, by which the image is sharply focussed on the movable observation field. This displacement arrangement is controlled by the output signals of two photoelectric detectors disposed on the same side of the observation field at a spacing from one another, after the output signals of the detectors have been passed through a comparison stage. These detectors respond to different beam components formed by the optical system even during a relative movement between the image and the system. The comparison stage yields a maximum output signal only in the condition of optimal focussing of the optical system. If the focussing is not optimal, then the correspondingly smaller signal controls the displacement arrangement, so that the latter acts preferably in the direction of signal optimisation. In the movable observation field there is situated a component, which is movable in a defined manner and which is provided with apertures.

It is, however, known that the prior art methods and apparatuses do not fully utilize the imaging light rays. The field of application is, therefore, rather limited. The object of the present invention is to adjust the method and apparatuses in such a way that the range of application and the exactness of sharp focusing apparatuses will greatly be improved by best fitting to the characteristics of present image structures and utilization of the imaging light rays.

SUMMARY OF THE INVENTION

According to the present invention this object is attained by providing a method of locating the plane of sharp focussing of an image formed by an imaging system, comprising the steps of employing a scattering element to scatter image radiation incident thereon, the scattering element being dimensioned to have at least one spatial frequency within a range corresponding to a range of spatial frequencies present in the image, generating electrical signals from at least a part of said scattered image radiation, combining said generated electrical signals to derive an electrical output signal, and so controlling the spacing between the imaging system and the scattering element as to cause the electrical output signal to adopt a maximum value.

Suitably, a measuring field is defined either in the plane of sharp focussing or in a plane conjugate thereto, the dimensions and position of the measuring field determining a detail of an object to be imaged by the imaging system on the scattering element in maximum sharpness.

Conveniently, at least one pair of beams of said scattered radiation are employed to generate first electrical signals, the method comprising the steps of causing relative movement between the image structure in the measuring field and the structure of scattering element in at least one co-ordinate direction parallel to the plane formed by said imaging system and to the plane defined by the scattering element, converting said first electrical signals depending on the intensity from the respective beams of the or each pair into second electric signals indicative of either the difference or the quotient of said first electrical signals, generating an electrical reference signal indicative of the relative movement of the scattering element, employing said further second electrical signals to determine the magnitude of the spacing between the plane of sharp focussing and the scattering element, and determining the sign of the spacing by measuring both the relative phase relationship of the individual first electrical signals and the phase relationship between those first electrical signals and the reference signal, and preferably the individual beams of the or each pair impinge upon two respective photoelectric detectors or the individual beams of the or each pair impinge successively on a single photoelectric detector.

A frequency filter may be employed to suppress frequency components outside the spectral range of the spatial frequency components present in the image radiation, the cut-off frequencies of the frequency filter being sufficiently remote from the spatial frequencies to avoid phase-inversion of the frequency components transmitted by the frequency filter.

The method may comprise the steps of generating third electrical signals indicative of the sum of the individual first signals of the or each pair, employing a beam splitting system and photoelectric detectors to generate push-pull signals additional to said third signals indicative of the sum, correlating said first electrical signals generated from the beams with said third signals indicative of the sum, generating resultant fourth signals indicative of the difference between the push-pull signals and said third signals indicative of the sum, and applying said resultant signals to a comparator, the output of which is employed to cause said controlling, and preferably the scattering element comprises a diffraction grating constructed to introduce phase differences between radiation components passing through different portions thereof, the push-pull signals being derived by determining phase jumps between different diffraction orders of said diffraction grating.

Suitably, first electrical signals are generated from individual beams of said scattered image radiation, which are diffracted by said diffraction grating into respective non-overlapping ranges of diffraction angles.

The imaging system may comprise at least two identical objectives mounted on common mounting means, the objectives being arranged to co-operate with one another to form a compound image from individual image components produced by the respective objectives, and preferably four identical objectives are provided.

Servo drive means may be employed to effect said controlling of the spacing between imaging system and scattering element, the imaging system being employed to scan an object space containing section lines on surfaces of equal distance, said distances extending from the imaging system up to values, which are large in comparison with the focal length of the imaging system, the image being formed from object elements, which are all equidistant from the imaging system.

According to a second aspect of the present invention there is provided an apparatus for carrying out the method defined above, the apparatus comprising a scattering element to scatter image radiation incident thereon, the scattering element being dimensioned to have at least one spatial frequency in the image radiation, a driving and reference signal generating element for the relative movement between the scattering element and the image of the object, photoelectric detecting means to generate electrical signals from at least a part of said scattered image radiation, means to combine said generated electrical signals thereby to derive an electrical output signal, and control means so to control the spacing between the scattering element and an imaging system directing the image radiation to the scattering element as to cause the electrical output signal to adopt a maximum value.

The apparatus may comprise an optical imaging system, which comprises an objective, a diaphragm being associated with the objective, the diaphragm comprising a plurality of pairs of eye-shaped crescent elements of equal size, the crescent elements being disposed symmetrically about the optical axis of the imaging system, the curved surfaces of the two crescent elements of each pair lying against the periphery of a circular disc of the same radius as the curved surfaces.

Conveniently, the scattering element comprises a diffraction grating, the control means comprising a comparator, which is arranged to receive its input signals from the detecting means and which comprises a phase-sensitive rectifier including an input to receive a signal indicative of the motion of the grating. The diffraction grating may be so constructed as to introduce phase differences between light components passing through different portions of the grating, said portions constructed as to cause a phase displacement of half a wavelength at the mean wavelength of the imaging light and occupying substantially half of the area of the grating presented to the light incident thereon.

The control means may comprise servo drive means including indicating means to indicate the distance of an object to be imaged from a part of the apparatus.

BRIEF DESCRIPTION OF THE DRAWING

The invention will be more readily comprehended from the following description when taken in conjunction with the appending drawing, wherein the sole FIGURE shows schematically the preferred embodiment.

DESCRIPTION OF THE PREFERRED EMBODIMENT

Referring now to the drawing, an optical imaging system 1 to be focussed can be displaced in a direction parallel to its optical axis by servo drive means in the form of a servo element 2, to focus the system on to a scattering element 3 comprising scattering structures. The scattering element 3 is dimensioned to have at least one spatial frequency with a range corresponding to a range of spatial frequencies present in the image formed by the imaging system 1. The light, incident from the left and carrying information from a desired object plane (also not shown), passes through the system 1 to the scattering element 3, which is movable as indicated by the arrow by means of a drive system 3' preferably perpendicularly to the optical axis of the imaging system 1. With the scattering element 3 there are associated two photoelectric detectors or transducers 4 and 5, which are disposed symmetrically about the optical axis and to which beam components from elements of the pupil of the system 1 selected by a diaphragm 7 and only incompletely overlapping one another are separately fed. The output signals of the detectors 4 and 5, after suitable amplification, are fed to separate inputs of a comparison stage 6.

In the comparison stage 6 the two signals are combined to form signals indicative of their difference or quotient in such a manner, that an electrical output signal dependent upon the difference in focussing between the image and the scattering element is obtained. The sign of the output signal is obtained by the modulation of the signals of the detectors 4 and 5, combined with one another, with a reference signal, which is generated in phase-locked manner to be indicative of the movement of the carrier of the scattering element 3, preferably from the control signal for the drive 3'. This output signal is applied, for example in known manner, for the controlling of the spacing between the system 1 and the scattering element 3 by means of the servo element 2.

The operation of the above described arrangement is as follows. The image structure to be sharply focussed and a measuring field structure defined by the scattering element 3 are caused to execute movement relative to one another parallel to their planes, by means of the drive 3'. The amplitude and phase, then obtained relative to the phase of the movement of the scattering element 3, of the signal formed from the signals of the two detectors 4 and 5 is a measure of the magnitude and sign of the spacing between the image plane and the auxiliary (scattering) structure plane. If the two planes coincide, then the signal in the comparison stage adopts an extreme value.

Even blaze effects, which can be caused only by phase objects and can have different intensities in the pupil parts as a consequence, are eliminated far-reachingly in arriving at the extreme value, by the modulation caused by the drive 3' in the alternating signals upon the separation and removal of the constant light current component.

In place of the structure plane moved according to only one co-ordinate direction or axis parallel to it, there can, if desired, be provided an arrangement in which this plane is moved according to two co-ordinate directions or axes preferably perpendicular to one another. In this case, further photoelectric detectors with comparison stages must be present. Such an arrangement is generally of significance, if the object comprises structures showing parallelism to the first mentioned coordinate axis.

Of course, apparatuses for carrying out the above described method may be employed in practice in different ways. Thus the output signal of the comparison stage 6 can control for example the sharp focussing or distance measurement carried out using the objective 1, or in the case of a searching operation in space it can be used in the case of a fixed focus of the system 1, to provide that there are projected on to the measuring field only images of object elements, which are all disposed on a curve of equal distance.

The structure of the scattering element 3 is, for the optimal utilisation of the image light flux, preferably a non-absorbing phase structure with a phase variation of $\lambda/2$ for the spectral centre of the imaging light. The sum of the surface components, which influence the radiation in the sense of a phase lead, is chosen to be preferably equal to the sum of the surface components, which influence the radiation in the sense of a phase lag, to obliterate by interference light which has passed directly and unscattered through the scattering structure.

The described embodiment can represent an improvement over known arrangements, by providing optimal adaptation to the characteristics of the image structures present as object and the almost complete utilisation of the light involved in the image generation. Thus both the range of application of the focussing arrangement can be enlarged and its accuracy in determining the focal plane can be increased.

The method may so be carried out, that components of all azimuths and spatial frequencies of image structures in the plane of the measuring field are made usable for evaluation, in that the widths and lengths of the scattering structures of the scattering element 3 contain spatial frequencies, which correspond to the spatial frequency range of the image structures, which is to be optimised during the sharp focussing operation. The spacing between the imaging system 1 and the measuring field is then altered in respect of its magnitude and direction, until the magnitude of the modulation transfer function in the image field segment employed in any particular case becomes maximal.

The measuring field may be defined in known manner in the image plane or in a plane conjugate thereto, the dimensions of the measuring field being sufficiently small to separate off an object detail or portion, which is imaged, focussed optimally, in the plane of the measuring field.

In a convenient method, beam components, which are disposed, from the pupil of the imaging system 1 to be focussed, pairwise symmetrically about the optical axis of the imaging system 1 and which are associated with surface elements overlapping one another only incompletely, are fed simultaneously geometrically to two equivalent photoelectric detectors. Alternatively, the feeding of the beam components to a single photoelectric detector may take place alternately one after the other. The image structure to be sharply focussed and the measuring field structure of the scattering element 3 are caused to execute movement relative to one another in direction parallel to one or two co-ordinate axes parallel to their planes, and the amplitudes of the difference or quotient signal obtained from the signals of the two detectors 4 and 5 or of the alternate signal sequence from the one detector, as the case may be, are evaluated as a measure of the magnitude of the spacing between the image plane and the plane of the measuring field. The sign of the spacing is determined by measurement of the phase relationships of the modulated signals to one another and to a reference signal derived directly from and indicative of the relative movement.

The spatial frequency range, to which the measurement is related, and the range of the relative speeds of the image plane and the measuring field may be restricted, the signal frequency range then being restricted by employing a signal frequency filter with its phase-rotating band edges still sufficiently far removed from the intelligence signal spectral range given by the corresponding local frequency range, to promote phase-correct difference or quotient formation.

For the better separation of the electrical measurement signals from interfering signal components and to obtain the sign of the deviation, these measurement signals may be electrically cross-correlated with yet a further signal indicative of the sum of the signals of each respective pair and obtained from the respective pairs of detector signals, there being gained by means of geometric or physical optical beam splitters and further photoelectric transducers a push-pull signal, which is additional to the signal indicative of the sum and which is switched to form its difference from the signal indicative of the sum. The resultant signal is then fed as a reference signal to comparison stage 6.

In the case of the presence of phase structures in the scattering element 3, the additional push-pull signal, in the event of restriction of the effective pupil surfaces by utilisation of separate diffraction angle ranges (preferably not overlapping one another), is gained by investigating the phase jumps between different diffraction orders.

In the event that the use of an objective in the system 1 for the achievement of an aperture ratio sufficient for depth resolution is not possible for any particular reason, the measurement may be distributed, for example in already proposed manner, among for example two or four identical objectives, which are located relative to one another by a fixed base or other common mounting means and which correspond to the pupil segments employed in the case of the formation of a mixed or compound image from at least two partial image fields.

For example in known manner with the use of a servo drive 2 energised by the measurement signal, in a searching operation in space there may be projected on to the measurement field images of object elements, which are all disposed on a curve of equal distance, section lines on surfaces of equal distance being placed in the scanned space up as far as distances, which are very large in comparison with the focal length of the imaging system 1.

Where the scattering element 3 comprises a diffraction grating with one or two-dimensional grating structures with a very marked fundamental frequency, there may be employed as a comparator 6 for example in known manner a phase-sensitive rectifier, which is controlled by an auxiliary signal, which is derived from the same auxiliary grating structure and which corresponds to its spatial frequency.

For the transmission of the high local frequencies there may be associated with the objective a diaphragm, which includes pairs of eye-shaped crescent elements of size equal to one another and disposed symmetrically about the optical axis as passages, the radii of which correspond to the radius of a circular disc and which by their curved surfaces hug the periphery of the disc.

The scattering structures of the scattering element 3 in the measuring field may comprise phase structures, which generate phase displacements of effectively $\lambda/2$ (half a wavelength) at the wavelength centre of the imaging light, the surface components displacing the phase by $\lambda/2$ constituting about 50 percent of the area of the measurement field presented to the light incident thereon.

A readout or indicating means for the distance measurement value of the measured object may be connected, for example in known manner, with a component forming part of the servo drive system and moved during energisation of that system.

What is claimed is:

1. A method of photoelectrically locating the plane of sharp focusing of an image formed by an imaging system comprising the steps of providing scattering structures moved relative to the image in a measuring field, the widths and lengths of the structures containing spatial frequencies which correspond to the spatial frequency range of the image structures to be optimized during the sharp focusing operation in order to make usable for evaluation components of all azimuths and spatial frequencies of image structures in the plane of the measuring field; and varying the spacing between the imaging system and the plane of the measuring field with respect to its magnitude and direction until the magnitude of the modulation transfer function in the evaluated image field segment becomes a maximum.

2. A method as claimed in claim 1, wherein a measuring field is defined either in the plane of sharp focusing or in a plane conjugate thereto, the dimensions and position of the measuring field selecting a detail of an object to be imaged by the imaging system on the scattering element in maximum sharpness.

3. A method as claimed in claim 1, wherein at least one pair of beams of said scattered radiation is employed to generate first electrical signals, the method comprising the steps of causing relative movement between the image structure in the measuring field and the structure of the scattering element in at least one coordinate direction parallel to the plane formed by said imaging system and the plane defined by the scattering element; converting said first electrical signals depending on the intensity of the respective beams of said pair into second electrical signals indicative of either the difference or the quotient of said first electrical signals; generating an electrical reference signal indicative of the relative movement of the scattering elements; employing said second electrical signals to determine the magnitude of the spacing between the plane of sharp focusing and the scattering element; and determining the sign of the spacing by measuring both the relative phase relationship of the individual first electrical signals and the phase relationship between those first electrical signals and the reference signal.

4. A method as claimed in claim 3, wherein a frequency filter is employed to suppress frequency components outside the spectral range of the spatial frequency components present in the image radiation, the cut-off frequencies of the frequency filter being sufficiently remote from the spatial frequency to avoid phase-inversion of the spatial frequency components transmitted by said frequency filter.

5. A method as claimed in claim 3, comprising the steps of generating third electrical signals indicative of the sum of the individual first signals of said pair; employing a beam splitting system and photoelectrical detectors to generate push-pull signals additionally to said third signals indicative of the sum; generating resultant fourth electrical signals indicative of the differences between the push-pull signals and said third signals indicative of the sum; and applying said resultant fourth signals to a comparator, the output of which is employed to cause said controlling.

6. A method as claimed in claim 5, wherein the scattering element comprises a diffraction grating constructed to introduce phase differences between radiation components passing through different portions thereof, the push-pull signals being derived by determining phase jumps between different diffraction orders of said diffraction grating.

7. A method as claimed in claim 5, wherein first electrical signals are generated from individual beams of said scattered image radiation, which are diffracted by said diffraction grating into respective non-overlapping ranges of diffraction angles.

8. A method as claimed in claim 1, wherein a servo drive means is employed to effect said controlling of the spacing between imaging system and scattering element, the imaging system being employed.

9. A method as claimed in claim 3, wherein the individual beams of said pair impinge upon two respective photoelectric detectors.

10. A method as claimed in claim 3, wherein the individual beams of said pair impinge successively on a single photoelectric detector.

11. A method as claimed in claim 1, wherein the imaging system comprises at least two identical objectives mounted on common mounting means, the objectives being arranged to co-operate with one another to form a compound image from individual image components produced by the respective objectives.

12. A method as claimed in claim 11, wherein four identical objectives are provided.

13. Apparatus for locating the plane of sharp focussing of an image formed by an imaging system comprising:
   a. a scattering element to scatter image radiation incident thereon, the scattering element being dimensioned to have at least one spatial frequency present in the object and transmitted by the image radiation;
   b. a driving and reference signal generating element for the relative movement between the scattering element and the image of the object;
   c. photoelectric detecting means to generate electrical signals from at least a part of said scattered image radiation;
   d. means to combine said generated electrical signals thereby to derive an electrical output signal; and
   e. control means so to control the spacing between the imaging system and the measuring field plane with respect to its magnitude and direction until the magnitude of the modulation transfer function in the evaluated image field segment becomes a maximum.

14. Apparatus as claimed in claim 13, comprising an optical imaging system, which comprises an objective, a diaphragm being associated with the objective, the diaphragm comprising a plurality of pairs of eye-shaped crescint elements of equal size with radii like the radius of the aperture of the objective.

15. Apparatus as claimed in claim 13, wherein the scattering element comprises a diffraction grating, the control means comprising a comparator, which is arranged to receive its input signals from the detecting means and which comprises an electrical correlator including an input to receive a signal indicative of the motion of the grating.

16. Apparatus as claimed in claim 13, wherein the diffraction grating is so constructed as to introduce phase differences between light components passing through different portions of the grating, said portions constructed as to cause a phase displacement of half a wave length at the mean wave length of the imaging light and occupying substantially half of the area of the grating presented to the light incident thereon.

17. Apparatus as claimed in claim 13, wherein the control means comprises servo drive means including indicating means to indicate the distance of an object to be imaged from a part of the apparatus.

18. Apparatus as claimed in claim 13, wherein said generated electrical signals from said scattered image radiation are used to obtain an output signal representing a measure for the distance between the scattering plane and the image plane.

* * * * *